United States Patent
Tachi (10) Patent No.: US 12,250,348 B2
(45) Date of Patent: *Mar. 11, 2025

(54) IMAGE PROCESSING APPARATUS INCLUDING PREDETERMINED FUNCTIONS METHOD OF CONTROLLING IMAGE PROCESSING APPARATUS, AND NON-TRANSITORY STORAGE MEDIUM

(71) Applicant: CANON KABUSHIKI KAISHA, Tokyo (JP)

(72) Inventor: Daiki Tachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,404

(22) Filed: Jan. 26, 2024

(65) Prior Publication Data

US 2024/0163381 A1 May 16, 2024

Related U.S. Application Data

(63) Continuation of application No. 18/166,082, filed on Feb. 8, 2023, now Pat. No. 11,924,386.

(30) Foreign Application Priority Data

Feb. 14, 2022 (JP) .................................. 2022-020342

(51) Int. Cl.
*H04N 1/00* (2006.01)

(52) U.S. Cl.
CPC ..... *H04N 1/00395* (2013.01); *H04N 1/00408* (2013.01); *H04N 1/00514* (2013.01); *H04N 1/00689* (2013.01); *H04N 2201/0094* (2013.01)

(58) Field of Classification Search
None
See application file for complete search history.

(56) References Cited

U.S. PATENT DOCUMENTS

2020/0099803 A1 3/2020 Tanabe

FOREIGN PATENT DOCUMENTS

JP 2014213459 A 11/2014

OTHER PUBLICATIONS

Office Action issued in U.S. Appl. No. 18/166,082, mailed Oct. 13, 2023.
Notice of Allowance issued in U.S. Appl. No. 18/166,082, mailed Dec. 8, 2023.

*Primary Examiner* — Lennin R Rodriguezgonzalez
(74) *Attorney, Agent, or Firm* — ROSSI, KIMMS & McDOWELL LLP (57) ABSTRACT

According to an aspect of the present disclosure, an image processing apparatus comprises one or more memories and one or more processors in communication with the one or more memories, the one or more processors performing: controlling executions of a plurality of applications; and setting a predetermined application to be activated from among the plurality of applications if detecting that a document is set, wherein the controlling includes activating the set predetermined application in a case where a document is set for an image reading unit.

18 Claims, 11 Drawing Sheets

IMAGE PROCESSING APPARATUS INCLUDING PREDETERMINED FUNCTIONS METHOD OF CONTROLLING IMAGE PROCESSING APPARATUS, AND NON-TRANSITORY STORAGE MEDIUM

BACKGROUND

Field

The present disclosure relates to an image processing apparatus, a method of controlling the image processing apparatus, and a non-transitory storage medium.

Description of the Related Art

Conventionally, there are image processing apparatuses that have a function of generating an image from a document read through a scanner and printing the generated image on a sheet, and a function of sending the generated image to a set destination. To execute these functions, a user operates an operation panel of the image processing apparatus for selecting a function or for setting parameters and items. Japanese Patent Application Laid-Open No. 2014-213459 describes that parameters of setting items frequently used in processing of print jobs are gathered and displayed in a setting screen.

For some users and apparatuses managed by users, certain functions of the image processing apparatuses are used as fixed settings. In such cases, it is troublesome to operate the operation panel every time the functions are used.

The purpose of this disclosure is to provide an image processing apparatus that allows a user to use desired functions without operating an operation panel.

SUMMARY

According to an aspect of the present disclosure, an image processing apparatus comprises one or more memories and one or more processors in communication with the one or more memories, the one or more processors performing: controlling executions of a plurality of applications; and setting a predetermined application to be activated from among the plurality of applications if detecting that a document is set, wherein the controlling includes activating the set predetermined application in a case where a document is set for an image reading unit of the image processing apparatus.

Further features of the present invention will become apparent from the following description of exemplary embodiments with reference to the attached drawings.

DESCRIPTION OF THE EMBODIMENTS

The configuration for carrying out the present disclosure is described with reference to the drawings.

Figure 1:
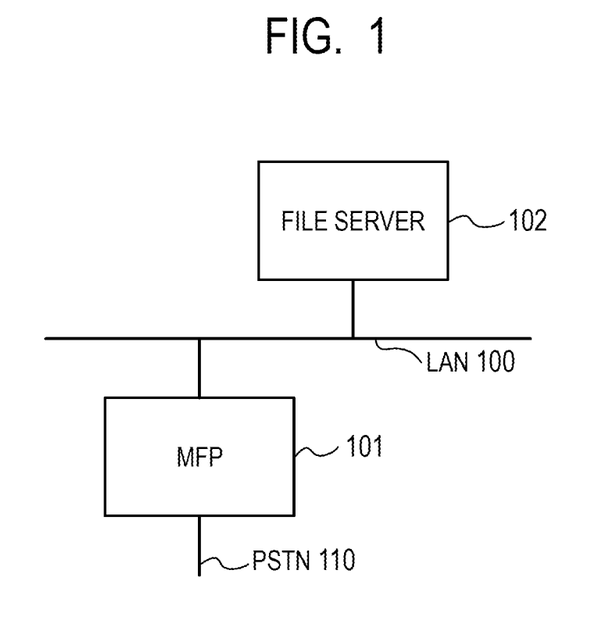
FIG. 1 shows an example of the overall configuration of an image processing system.

FIG. 1 shows an example of the overall configuration of an image processing system related to the present embodiment. The image processing system includes a multifunction peripheral (MFP) 101 and a file server 102. These apparatuses can communicate with each other via a LAN (Local Area Network) 100. The MFP 101 is a multifunction device including a scanner, a printer, etc., and is an example of an image processing apparatus. The file server 102 is a server apparatus having a network folder that can be accessed by the MFP 101, and manages files such as image files.

The MFP 101 performs file transmission of image data using communication protocols such as SMB or FTP with a folder of the file server 102 as the destination. In addition to the file server 102, the MFP 101 can also perform file transmission with a folder of a client personal computer (PC) on the LAN 100 as the destination. The MFP 101 can also send image data using an e-mail via a mail server. The MFP 101 is connected to a public telephone network (PSTN) 110, and can also send faxes to a fax machine and receive faxes from the fax machine.

The image processing system according to the present embodiment includes the MFP 101 and the file server 102. However, the image processing system of the present disclosure is not limited to the above configuration. For example, the MFP 101 may also serve as the file server 102.

Figure 2:
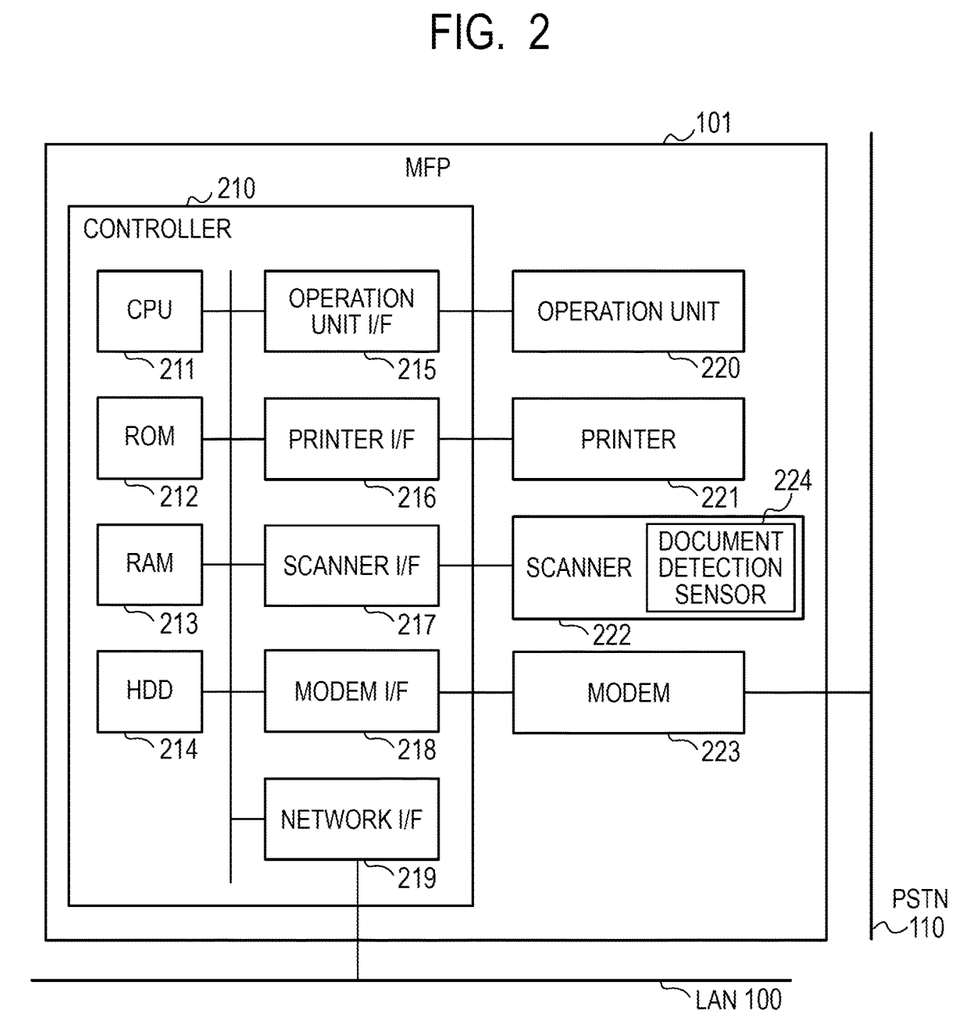
FIG. 2 shows an example of an MFP hardware configuration.

FIG. 2 is a block diagram showing an example of the hardware configuration of the MFP 101. The MFP 101 includes a controller 210, an operation unit 220, a printer 221, a scanner 222, and a modem 223. The controller 210 includes the following components 211 to 219 and controls the overall operation of the MFP 101. A central processing unit (CPU) 211 reads programs stored in a ROM 212 or an HDD 214 and performs various controls such as read control or transmission control. A RAM 213 is used as a temporary storage area such as a main memory or a work area of the CPU 211. In the present embodiment, the single CPU 211 uses a single memory (the RAM 213) to perform the processes of the flowcharts described later. For example, multiple CPUs or multiple RAMs or HDDs may cooperate to perform the processes of the flowcharts described later. The HDD 214 stores image data, various programs, and various data tables described later.

An operation unit I/F 215 is an interface connecting the operation unit 220 and the controller 210. The operation unit 220 is equipped with a liquid crystal display unit (operation panel) having a touch panel, a keyboard, etc., and receives operations from the user and transmits the input operations to the controller 210. A printer I/F 216 is an interface connecting the printer 221 and the controller 210. The image data for printing is transferred from the controller 210 to the printer 221 via the printer I/F 216 and printed on a sheet by the printer 221. A scanner I/F 217 is an interface connecting the scanner 222 and the controller 210. The scanner 222, which is equipped with a platen or an auto document feeder (ADF), reads images on a document set on the platen or the ADF to generate image data, which is then input to the controller 210 via the scanner I/F 217. The scanner 222 is an example of an image reading unit. The MFP 101 can print out the image data generated by the scanner 222 via the printer 221, as well as send a file or send an email. The scanner 222 is also equipped with a document detection sensor 224 for detecting a document being set on the platen or the ADF, and the detection result by the document detection sensor 224 is input to the controller 210 via the scanner I/F 217.

A modem I/F 218 is an interface connecting the modem 223 and the controller 210. The modem 223 is an interface connecting the controller 210 (MFP 101) to the PSTN 110. The MFP 101 can use the modem 223 to fax the image data generated by the scanner 222 to a fax machine on the PSTN 110. A network I/F 219 is an interface connecting the controller 210 (MFP 101) to the LAN 100. The MFP 101 transmits image data and various types of information generated by the scanner 222 to an external device (such as the file server 102) on the LAN 100, and receives various types of information from the external device on the LAN 100 via the network I/F 219.

Figure 3:
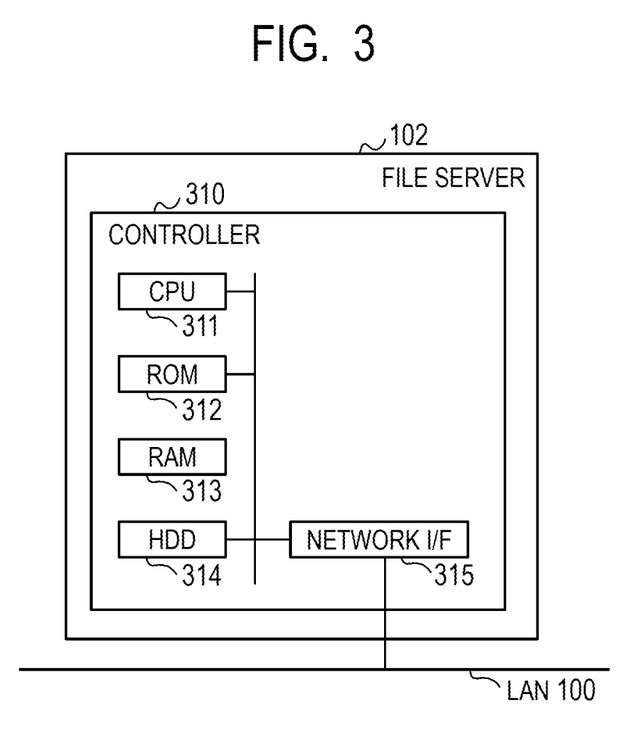
FIG. 3 shows an example of a hardware configuration of a file server.

FIG. 3 is a block diagram showing an example of the hardware configuration of the file server 102. The file server 102 includes a controller 310. The controller 310 includes the following components 311 to 315, and controls the entire operation of the file server 102. A CPU 311 reads a control program stored in a ROM 312 and executes various processes. A RAM 313 is used as a temporary storage area such as a main memory and a work area of the CPU 311. An HDD 314 stores image files, various programs, and the like. A network I/F 315 is an interface connecting the controller 310 (the file server 102) to the LAN 100. The file server 102 sends and receives various information to and from an external device (MFP 101, etc.) on the LAN 100 via the network I/F 315.

Figure 4:
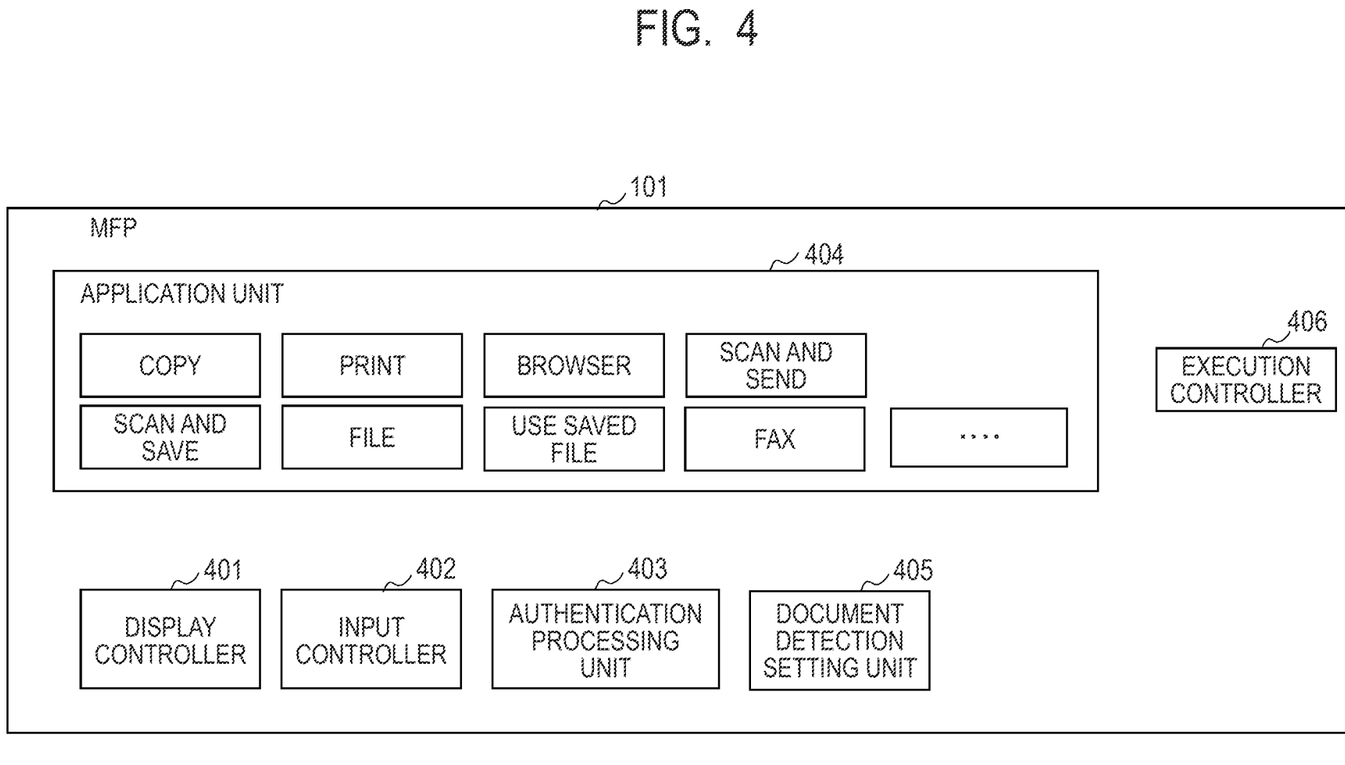
FIG. 4 shows an example of a software configuration of the MFP.

FIG. 4 is a block diagram showing an example of the software configuration of the MFP 101. The MFP 101 includes, as software modules, a display controller 401, an input controller 402, an authentication processing unit 403, an application unit 404, a document detection setting unit 405, and an execution controller 406. Functions of the software modules shown in FIG. 4 are realized when the CPU 211 of the MFP 101 executes a program stored in the ROM 212 or the HDD 214.

The display controller 401 displays a screen in the operation unit 220 for receiving operations from the user. Specifically, the display controller 401 displays a home screen for selecting and activating an application on the MFP 101, a setting screen for functions of the application, and the like.

The input controller 402 analyzes operation signals received from the operation unit 220, determines the processing corresponding to the operation signals according to analysis results, and inputs a result of the determination to the display controller 401 or the execution controller 406.

The authentication processing unit 403 displays an authentication screen in the operation unit 220 and performs user authentication using authentication information such as an ID and a password entered by the user. The authentication information of users of the MFP 101 is stored in the HDD 214 in association with the user information including user names and the destination (email addresses, folder paths, etc.) of image data of the users. If the user authentication is successful, the authentication processing unit 403 performs a login process to allow the users to log in to the MFP 101. If the logout instruction is issued, the authentication processing unit 403 performs a logout process to allow the users who are logging in to log out of the MFP 101.

The application unit 404 manages multiple applications provided in the MFP 101. In the present embodiment, the application unit 404 manages the following applications.

Copy: An application that provides a function to read an image on a document using the scanner 222 and to print the generated image data using the printer 221.

Print: An application that provides a function to print image data using the printer 221 based on a print job submitted from an external device such as a client PC.

Browser: An application that provides an ability to view, print, and save data stored in a web server through a web browser.

Scan and Send: An application that provides a function to read an image on a document using the scanner 222 and then send the generated image data to an external device on the LAN 100 via the network I/F 219.

Scan and Save: An application that provides a function to read an image on a document using the scanner 222 and then save the generated image data in a storage device such as the HDD 214.

Use Saved File: An application that provides a function to print image data stored in a storage device such as the HDD 214 using the printer 221 or send the image data to an external device.

Fax: An application that provides an ability to read images on a document using the scanner 222 and then send the generated image data to an external device on the PSTN 110 using the modem 223.

The applications managed by the application unit 404 are not limited to the above applications, and can be added or reduced according to user's instructions.

Based on instructions from the user, the document detection setting unit 405 sets for each user an application to be activated if a document being set is detected. The applications that have been set are also stored in the HDD 214.

The execution controller 406 performs execution control of the applications managed by the application unit 404. In the present embodiment, the execution controller 406 detects a document being set based on a detection result received from the document detection sensor 224 of the scanner 222. If the document being set is detected, the execution control of the applications set for the document detection setting unit 405 is performed.

Figure 5:
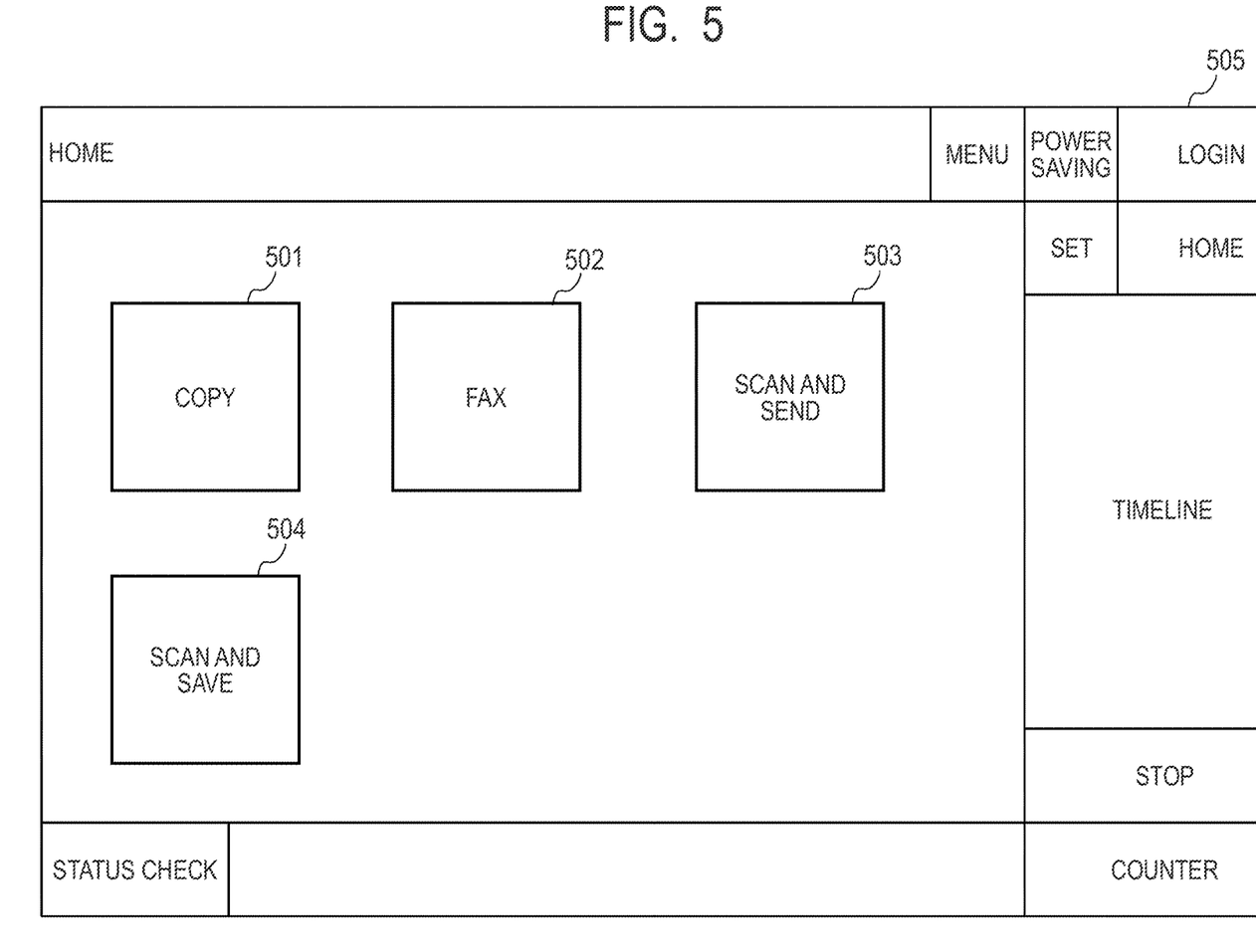
FIG. 5 shows an example of a screen displayed in an operation unit.

FIG. 5 shows a display example of the home screen. The home screen of FIG. 5 is displayed in the operation unit 220. The home screen is displayed if a home key provided in an application screen is pressed, or is also displayed immediately after activating the MFP 101 or while the MFP 101 is in a standby mode. The home screen according to the present embodiment shows several operation keys for activating applications.

Figure 6:
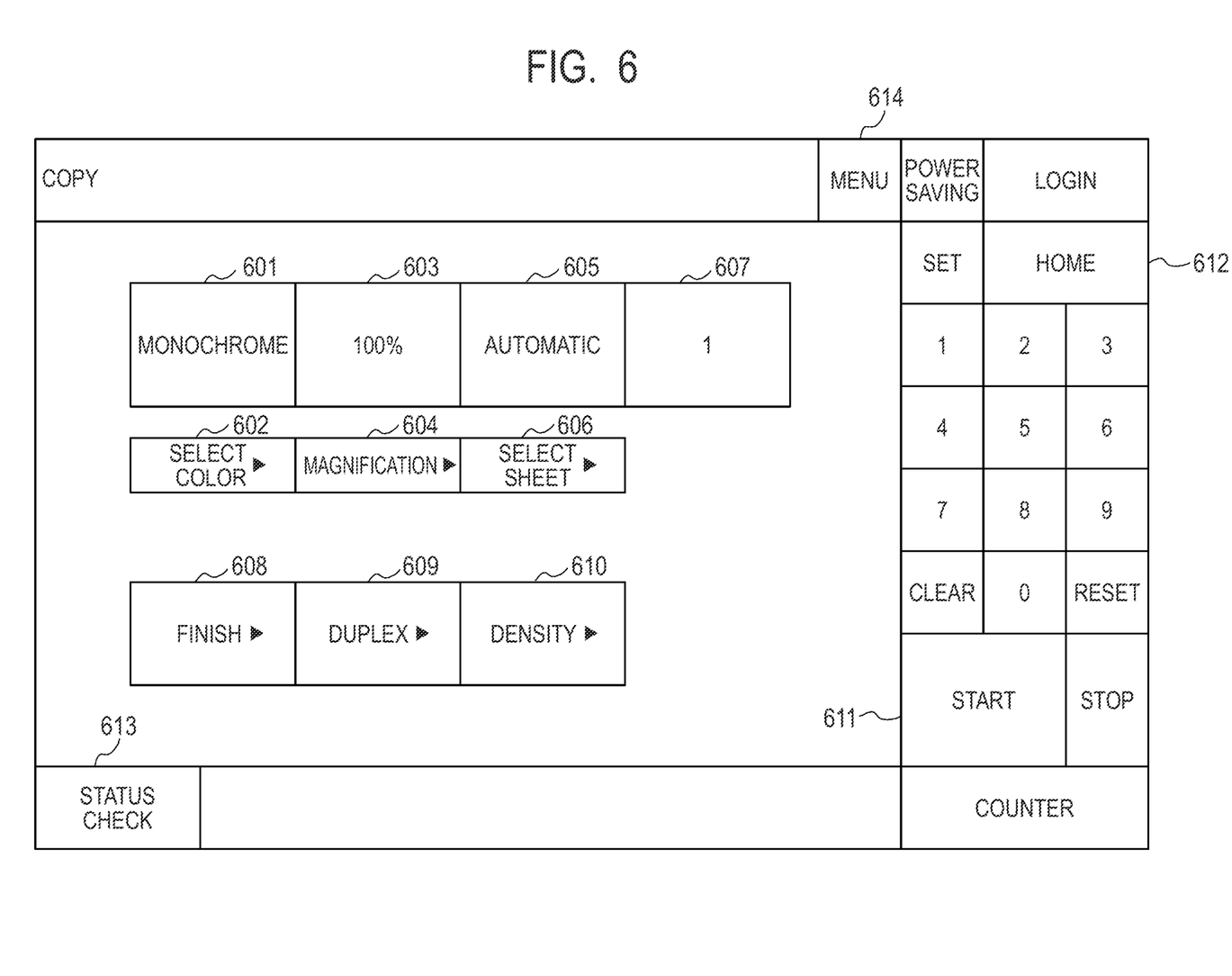
FIG. 6 shows an example of a screen displayed in the operation unit.

A copy key 501 is used for activating the copy application. If the copy key 501 is pressed, the CPU 211 activates the copy application and displays a screen of the copy application in the operation unit 220. In the present embodiment, the screen shown in FIG. 6 is displayed if the user presses the copy key 501.

A fax key 502 is used for activating the fax application. If the fax key 502 is pressed, CPU 211 activates the fax application and displays a screen of the fax application in the operation unit 220.

A scan and send key 503 is used for activating the scan and send application. If the scan and send key 503 is pressed, the CPU 211 activates the scan and send application and displays a screen of the scan and send application in the operation unit 220.

A scan and save key 504 is used for activating the scan and save application. If the scan and save key 504 is pressed, the CPU 211 activates the scan and save application and displays a screen of the scan and save application in the operation unit 220.

A login key 505 is used for performing login processing. If the login key 505 is pressed, the CPU 211 displays an authentication screen in the operation unit 220 to perform user authentication.

FIG. 6 shows a display example of a setting screen of the copy function. The screen of FIG. 6 is displayed in the operation unit 220 in response to an instruction from the user. The screen of FIG. 6 is displayed when the user performs print settings to be used when executing the copy function.

An item 601 shows a monochrome/color setting for printing. An operation key 602 is used for changing the setting of the item 601. A user can change the setting of monochrome/color by using a color selection screen (not shown) displayed by pressing the operation key 602.

An item 603 shows the setting of magnification for printing. An operation key 604 is used for changing the setting of the item 603. The user can change the setting of magnification for printing by using a magnification selection screen (not shown) displayed by pressing the operation key 604.

A setting of sheets to be used for printing is displayed in an item 605. An operation key 606 is used for changing the setting of the item 605. The user can change a setting of the sheets to be used for printing by using a sheet selection screen (not shown) displayed by pressing the operation key 606.

An item 607 shows a setting of the number of copies to be printed. The setting for the item 607 can be changed by using a numeric keypad shown on the right side of FIG. 6.

An operation key 608 is used for setting finish processing for printed matters. The user can confirm and change a setting of the finish processing such as stapling by using a finish selection screen (not shown) displayed by pressing the operation key 608.

An operation key 609 is used for setting one side/both sides (duplex) for printing. The user can check and change a setting of one side/both sides by using a duplex setting screen (not shown) displayed by pressing the operation key 609.

An operation key 610 is used for setting the density for printing by using the printer 221. The user can confirm and change a density setting of the printed matters by using a density setting screen (not shown) displayed by pressing the operation key 610.

As described above, the setting values of the setting items of the copy function can be checked and changed through the screen shown in FIG. 6. The setting items that can be checked and changed are not limited to these items, and setting parameters of other setting items may be displayed on the screen so that these parameters can be checked and changed.

A start key 611 is used for instructing the execution of the copy function with the current setting value displayed in the operation unit 220. If the start key 611 is pressed, the CPU 211 executes the copy function with the current setting parameters. A home key 612 is used for displaying the home screen of FIG. 5 in the operation unit 220. The home screen of FIG. 5 is displayed in response to the user pressing the home key 612. The user can call up other applications using the home screen displayed in response to pressing the home key 612. A status check key 613 is used for displaying a screen (status confirmation screen) for confirming a status of the MFP 101. The status confirmation screen is displayed in response to the user pressing the status check key 613. A menu key 614 is used for instructing the registration of the current setting parameters displayed in the operation unit 220. If the menu key 614 is pressed, the CPU 211 displays a pop-up on the screen of FIG. 6 as shown in FIG. 7.

Figure 7:
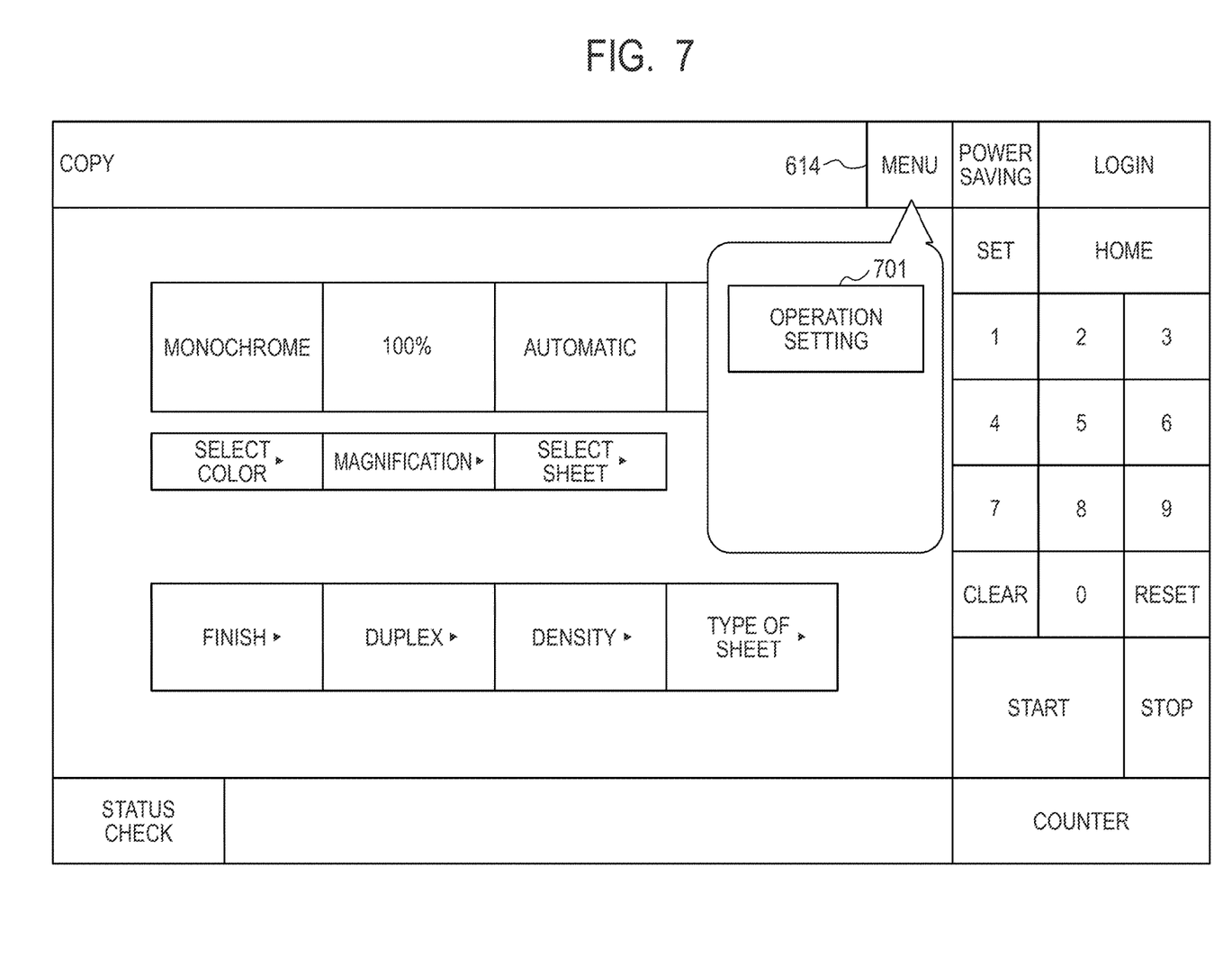
FIG. 7 shows an example of a screen displayed in the operation unit.

FIG. 7 shows a display example of a screen for registering print settings of the copy function for each user. FIG. 7 shows a screen displayed if the menu key 614 of the screen shown in FIG. 6 is pressed. An operation key 701 is displayed in a pop-up that appears below the menu key 614. The operation key 701 is used for displaying a screen of setting an operation if a document being set is detected. In the present embodiment, if the operation key 701 is pressed, the CPU 211 displays the screen of FIG. 8 in the operation unit 220. It should be noted that, although the following descriptions are made with an example of performing a setting to execute the copy function when a document being set is detected, the function that can be set to execute when a document being set is not limited to the copy function. Other functions such as the scan and send function, the scan and save function, or the fax function can be also set to be executed as long as the function is performed using the image data generated by reading an image on a document via the scanner 222. Depending on through which application screen the user gives an instruction to set an operation when detecting a document being set, the CPU 211 can set an application to be activated when detecting the document being set.

Figure 8:
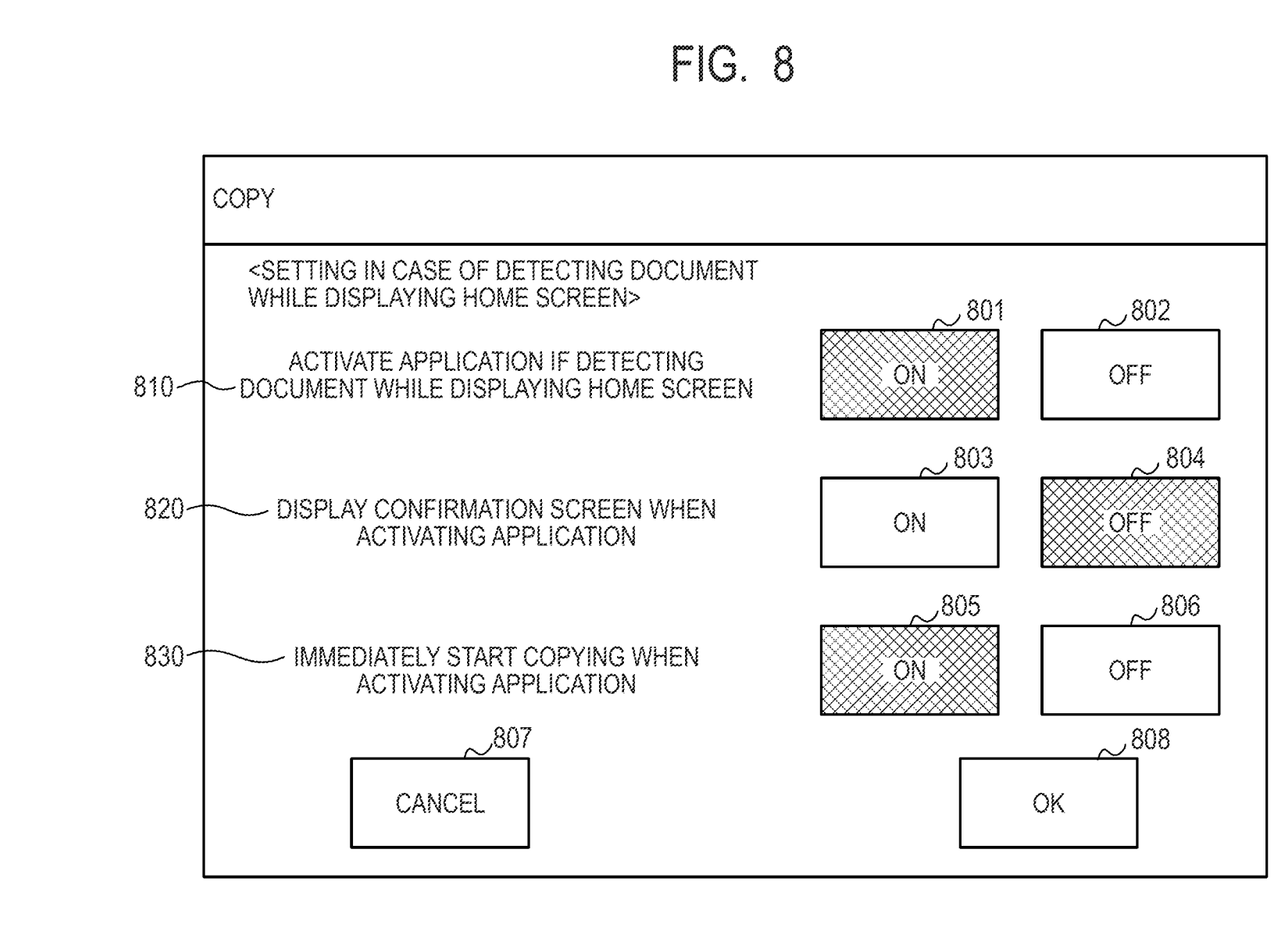
FIG. 8 shows an example of a screen displayed in the operation unit.

FIG. 8 shows an example of a screen for setting an operation to be executed when a document being set is detected. FIG. 8 shows a screen displayed if the operation key 701 shown in the screen of FIG. 7 is pressed.

An item 810 is used for setting whether to activate the application that has been set when a document being set is detected while the home screen is displayed. The descriptions below are shown on the assumption that the copy application is set. An operation key 801 and an operation key 802 are mutually exclusive keys only one of which can be selected, and the ON/OFF setting of the item 810 can be switched according to the user's operation of the operation keys 801 and 802. If the "ON" is selected, the CPU 211 activates the copy application if detecting a document being set while the home screen is displayed. In the present embodiment, the copy application is activated with the parameters set via the screen shown in FIG. 6. If the "OFF" is selected, the CPU 211 does not activate the copy application even if detecting a document being set while the home screen is displayed. Settings through an item 820 and an item 830 described below are effective only if the item 810 is set to the "ON".

The item 820 is used for setting whether to display a confirmation screen for allowing the user to confirm parameters that have been set when detecting a document being set while the home screen is displayed.

An operation key 803 and an operation key 804 are mutually exclusive keys only one of which can be selected, and the ON/OFF setting of the item 820 can be switched according to the user's operation of the operation keys 803 and 804. That is, according to the user's instruction, the CPU 211 executes a setting about whether or not to display the confirmation screen when the document being set is detected while the home screen is displayed. If the "ON" is selected, the CPU 211 displays the confirmation screen when the document being set is detected while the home screen is displayed. If the "OFF" is selected, the CPU 211 displays the screen of the copy application (FIG. 6) but does not display the confirmation screen.

An item 830 is used for setting whether to execute the copy function without instruction via a press of the start key when a document being set is detected while the home screen is displayed. An operation key 805 and an operation key 806 are mutually exclusive keys only one of which can be selected, and the ON/OFF setting of the item 830 can be switched according to the user's operation of the operation keys 805 and 806. That is, according to the user's instruction, the CPU 211 executes a setting about whether or not to immediately execute the function of the activated application when the document being set is detected while the home screen is displayed. If the "ON" is set, the CPU 211 executes the copy function with parameters that are set when a document being set is detected while the home screen is displayed. If the "OFF" is set, the CPU 211 displays the screen of the copy application (FIG. 6) but does not execute the copy function.

If a cancel key 807 is pressed, the CPU 211 cancels the settings shown in the screen of FIG. 8 and displays the screen of FIG. 6 in the operation unit 220. If an OK key 808 is pressed, the CPU 211 sets the application to be activated, the setting values (parameters) shown in the screen of FIG. 8 and the setting values (parameters) shown in the screen of FIG. 6, links the application and the parameters with a user name of the logged-in user, and stores the above application and settings in the HDD 214.

As shown above, the CPU 211 sets for each user the application to be activated at the time of document being detected and the operation after the application is activated. In the present embodiment, the CPU 211 registers information stored in a setting table shown in Table 1 below at the time of document being detected, which is stored in the HDD 214. Note that if the item 810 is set to the "OFF" on the screen of FIG. 8, the CPU 211 does not register information to the setting table at the time of document being detected.

TABLE 1

| User name | Application | Confirmation screen | Immediate execution | Setting parameters |
|---|---|---|---|---|
| Device | Copy | ON | ON | Finish |
| A | Copy | OFF | ON | Duplex |
| C | Scan and Send | ON | ON | |

Table 1 shows an example of the setting table at the time of document being detected. If a document being set is detected while the home screen is displayed, the CPU 211 reads the setting table at the time of document being detected and checks whether the user who is logging in is registered in the read setting table. If the user who is logging in is registered, the execution control of the application is performed according to the setting information associated with the user. User names of users of the MFP 101 are registered in the column "User name" shown in Table 1. By associating the setting information with a device name (Device), the application to be activated at the time of document being detected and the operation after the application is activated can be set for each device. In this case, for example, a user having administrative authority can specify an application to be activated at the time of document being detected on the setting screen. In the column "Application" shown in Table 1, a name of the application to be activated when a document being set is detected is registered. In the present embodiment, the copy application is registered, but other applications such as the scanning and sending application may be registered. In the column of "Confirmation screen" shown in Table 1, the ON/OFF setting parameters of the item 820 shown in FIG. 8 are registered. In the column "Immediate execution" shown in Table 1, the ON/OFF setting parameters of the item 830 shown in FIG. 8 are registered. In the column "Setting parameters" shown in Table 1, the setting parameters on the screen of FIG. 6 that have been set when the OK key 808 shown in FIG. 8 has been pressed is registered. It should be noted that, although the present embodiment shows a method for setting an operation at the time of document being detected by user's operations through the screen of the copy application, the method for setting the operation at the time of document being detected is not limited to the described method. For example, the method may be a method in which a user with administrative authority displays a setting screen provided by the MFP 101 on a client PC or the like and sets an operation after the application is activated for each user on the client PC.

Figure 9:
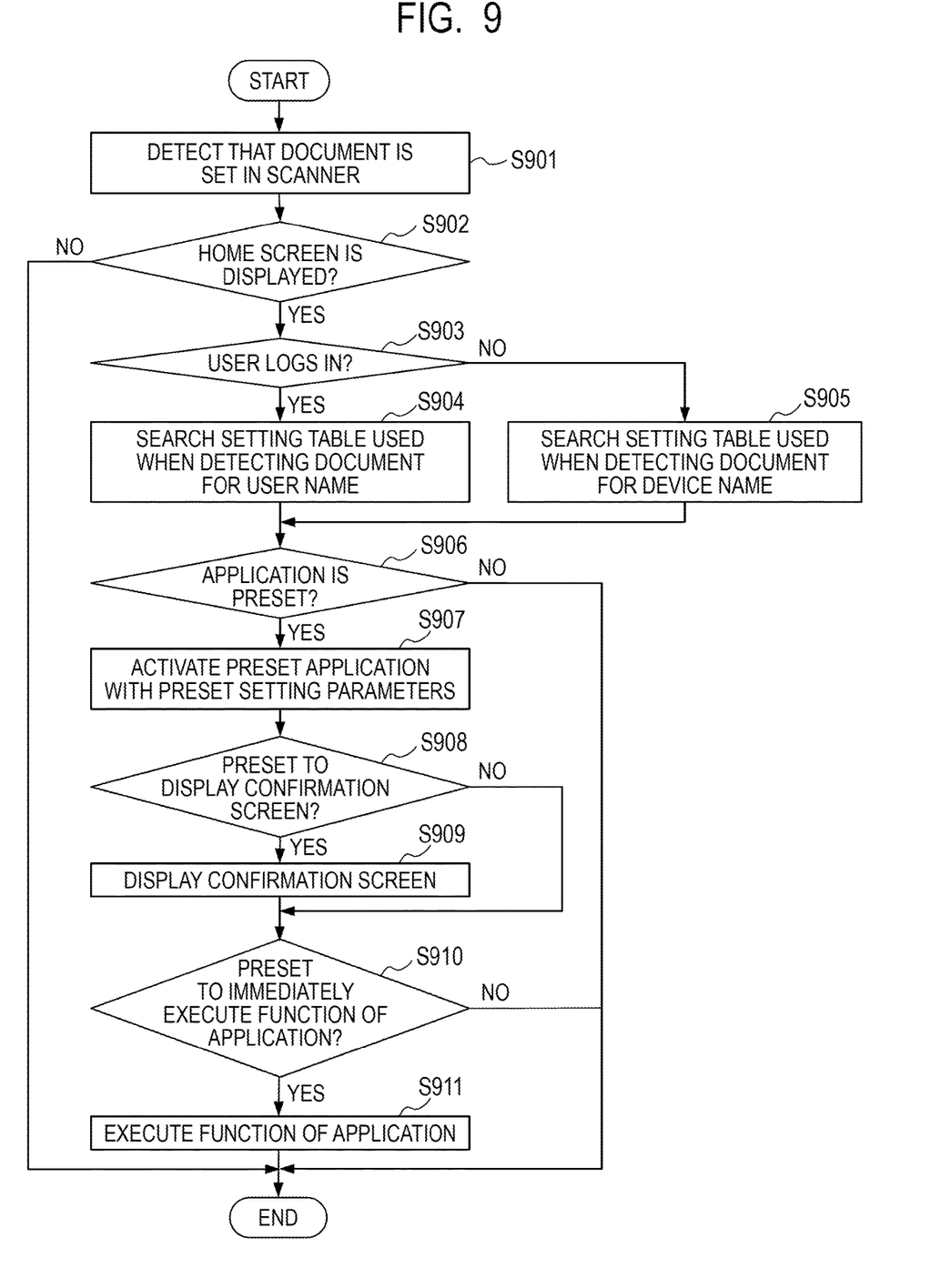
FIG. 9 is a flowchart showing the processing to be performed when detecting a document being set.

FIG. 9 is a flowchart showing the processing executed by the MFP 101 pertaining to the present embodiment if detecting a document being set. If the CPU 211 of the MFP 101 executes a program stored in the ROM 212 or the HDD 214, each of the processes shown in the flowchart of FIG. 9 is realized. The flowchart in FIG. 9 starts if a user sets a document in the scanner 222. Each process (step) of the flowchart is described below by adding an S (step) at the beginning of each symbol.

In step S901, the CPU 211 detects that a document has been set based on a detection result received from the document detection sensor 224 of the scanner 222.

Next, in step S902, the CPU 211 determines whether a screen displayed in the operation unit 220 is the home screen. In the present embodiment, the CPU 211 determines based on a display application table shown in Table 2 below. The display application table is a data table that manages screens displayed in the operation unit 220 and is stored in the HDD 214. The operation unit 220 is operable to display multiple application screens and the home screen with overlapping each other, and the CPU 211 manages an order of displaying the screens by using the display application table. The screen indicated by the "Display order 1" shown in the display application table becomes the screen currently displayed in the operation unit 220. If the CPU 211 determines that the screen displayed in the operation unit 220 is the home screen, the process proceeds to step S903. If the CPU 211 determines that the screen displayed in the operation unit 220 is not the home screen, the flowchart ends. That is, the CPU 211 does not activate the application if the home screen is not displayed even if detecting a document being set. In the present embodiment, the CPU 211 determines whether the screen displayed in the operation unit 220 is the home screen or not. However, the subject to be determined is not limited to the home screen. The CPU 211 may determine whether or not a screen displayed in the operation unit 220 is a predetermined screen such as a screen for confirming the status of the MFP 101 (status confirmation screen).

TABLE 2

| Display order | Application name |
|---|---|
| 1 | home |
| 2 | print |
| 3 | scan and send |

In step S903, the CPU 211 determines whether or not the user has logged in. In the present embodiment, the CPU 211 checks a login user table as shown in Table 3 below.

The login user table is a data table that manages users who are logging in and is stored in the HDD 214. If the user authentication is successful, the MFP 101 reads information of the corresponding user from the user information stored in the HDD 214 and registers the information of the corresponding user in the login user table. If the CPU 211 determines that the user information is registered in the login user table, the CPU 211 assumes that the user has logged in and the processing proceeds to step S904. If the user information is not registered in the login user table, the processing proceeds to step S905.

TABLE 3

| User name | Mail address | Folder path |
|---|---|---|
| A | A@test.com | ¥¥test¥A |

In step S904, the CPU 211 searches the user names in the setting table at the time of document being detected that is stored in the HDD 214 for a user name of the user having logged in.

In step S905, the CPU 211 searches the user names in the setting table at the time of document being detected that is stored in the HDD 214 for a device name.

In step S906, the CPU 211 determines, based on a result of the search in step S904 or step S905, whether or not an application linking with the user name being logged in or the device name to be activated at the time of document being detected has been set. If the CPU 211 determines that an application to be activated at the time of document being detected has been set, the processing proceeds to step S907. If the CPU 211 determines that an application to be activated at the time of document being detected has not been set, the flow chart ends.

In step S907, the CPU 211 activates the application that has been set with the setting parameters based on information of settings linked with the user or the device. For example, if the copy application is set, the CPU 211 activates the copy application and displays the screen of FIG. 6 in the operation unit 220 with the setting parameters reflected. If the setting parameter is not set, the application may be activated with default setting parameters.

In step S908, the CPU 211 determines whether the item 820 of FIG. 8 is set to the "ON". That is, the CPU 211 determines whether the confirmation screen for setting parameters is set to be displayed based on the information of the settings linked with the user or the device. If the CPU 211 determines that the confirmation screen is set to be displayed, the processing proceeds to step S909. If the CPU 211 determines that the confirmation screen is set not to be displayed (that is, the item 820 shown in FIG. 8 is set to the "OFF"), the processing proceeds to step S910.

In step S909, the CPU 211 displays the confirmation screen of the setting parameters that have been set. For example, a preview screen for printing is displayed.

In step S910, the CPU 211 determines whether the item 830 of FIG. 8 is set to the "ON". That is, the CPU 211 determines whether the function of the activated application is set to be immediately executed based on the information of the settings linked with the user or the device. If the CPU 211 determines that the function of the application is set to be immediately executed, the processing proceeds to step S911. If the CPU 211 determines that the function of the activated application is set not to be immediately executed (that is, the item 830 of FIG. 8 is set to the "OFF"), the processing of the flowchart ends.

In step S911, the CPU 211 executes the function of the application activated in step S907. For example, if the copy application is set, the CPU 211 executes the copy function. Specifically, the image data generated by reading the image on a document that is set in the scanner 222 is printed by the printer 221. Then, the flowchart ends. The CPU 211 may execute the function of the application several seconds after detecting the document being set (step S901). This allows the user to cancel the execution of the function through a cancellation operation from the user even if the document is set by mistake.

According to the flowchart of FIG. 9 as described above, presetting an application to be activated at the time of document being detected and presetting an operation to be executed after the application is activated allow users to use the desired function when a document is just set. Therefore, operations of selecting the function via an operation panel or the operation of instructing the execution of the function becomes unnecessary, which saves the user's time and trouble. In the above descriptions, it is assumed that the user has logged in before the start of the flowchart shown in FIG. 9. If the user has logged in after a document is set, the flowchart processing starts from step S904.

Figure 10:
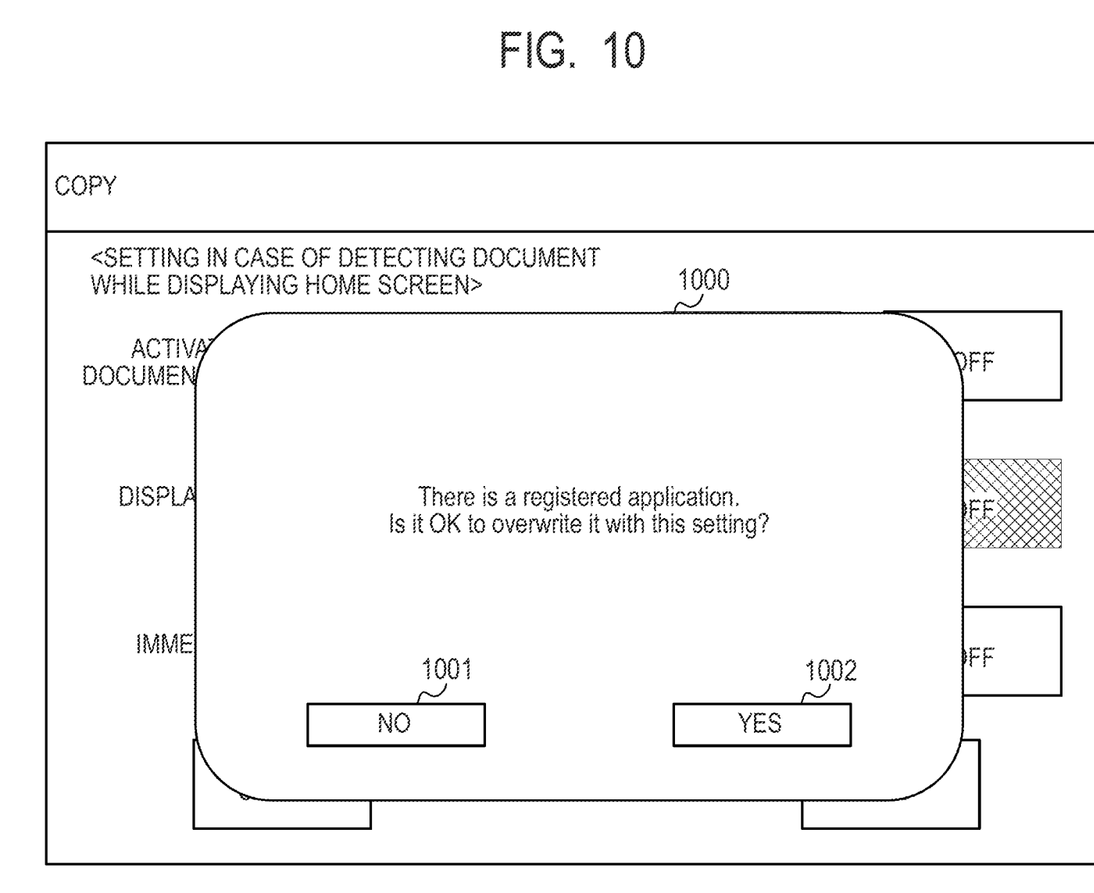
FIG. 10 shows an example of a screen displayed in the operation unit.

In the present embodiment, in order to set for a single user a single application to be activated at the time of document being detected, the CPU 211 executes a notification if an operation instructing to register an operation setting is received from a user whose operation setting at the time of document being detected has already been registered. Specifically, if the OK key 808 shown in FIG. 8 is pressed, the CPU 211 first reads the setting table at the time of a document being detected that is stored in the HDD 214, and determines whether the operation setting of the user who has the same name as the user who is logging in is registered in the read setting table. If the CPU 211 determines that the operation setting of the user having the same name is registered, the CPU 211 displays a notification screen on the screen of FIG. 8. FIG. 10 shows a display example of the notification screen. A notification screen 1000 is displayed on the screen of FIG. 8. In the notification screen 1000, it is displayed that the application to be activated at the time of a document being detected has been registered. The notification screen 1000 includes a No button 1001 for instructing not to overwrite the setting and a Yes button 1002 for instructing to overwrite the setting. If the No button 1001 is pressed, the CPU 211 hides the notification screen.

If the Yes button 1002 is pressed, the CPU 211 overwrites the operation setting of the user having the same name registered in the setting table.

Figure 11:
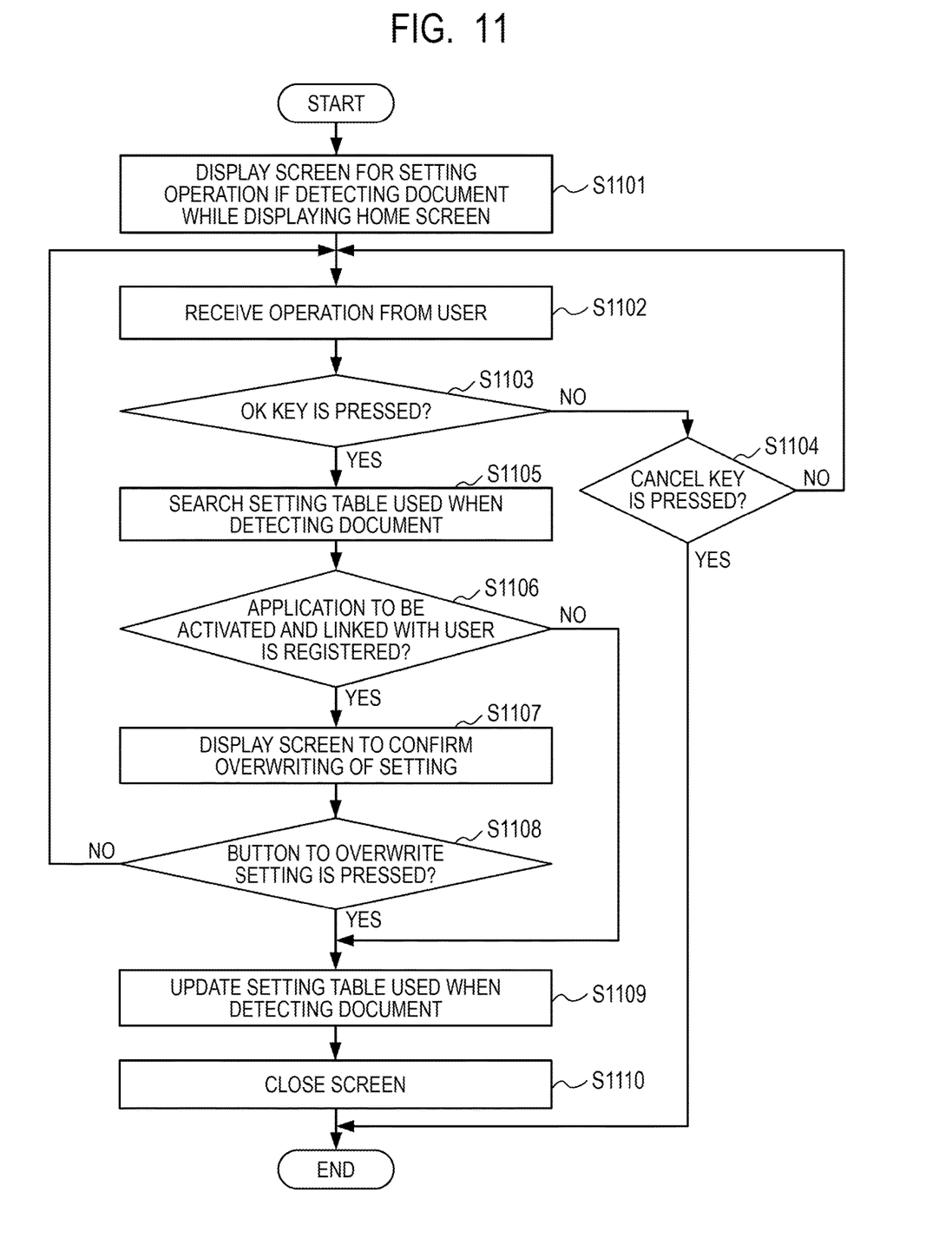
FIG. 11 is a flowchart showing the process of registering settings when detecting a document being set.

FIG. 11 is a flowchart showing the process of registering the operation setting at the time of a document being detected. Each process of the flowchart shown in FIG. 11 is realized when the CPU 211 of the MFP 101 executes a program stored in the ROM 212 or the HDD 214. The flowchart of FIG. 11 is started if the user presses the operation key 701 in the screen of FIG. 7.

In step S1101, the CPU 211 displays a screen (FIG. 8) in the operation unit 220 for setting an operation at the time of detecting a document being set.

In step S1102, the CPU 211 receives an operation of the operation keys on the screen of FIG. 8 from a user.

In step S1103, the CPU 211 determines whether the operation key pressed is the OK key 808 of FIG. 8. If the CPU 211 determines that the operation key pressed is the OK key 808, the processing proceeds to step S1105. If the CPU 211 determines that the operation key pressed is not the OK key 808, the processing proceeds to step S1104.

In step S1104, the CPU 211 determines whether the operation key pressed is the cancel key 807 of FIG. 8. If the CPU 211 determines that the operation key pressed is the cancel key 807, the CPU 211 terminates the processing of the flowchart. If the CPU 211 determines that the operation key pressed is not the cancel key 807, the CPU 211 executes the processing corresponding to the operation received in step S1102 and proceeds to step S1102.

In step S1105, the CPU 211 searches user names in the setting table at the time of a document being detected that is stored in the HDD 214 for the user being logging in.

In step S1106, the CPU 211 determines, based on a result of the search in step S1105, whether or not an application linking with the user name being logged in or the device name to be activated at the time of a document being detected has been set. If the CPU 211 determines that an application to be activated at the time of a document being detected has been set, the processing proceeds to step S1107. If the CPU 211 determines that an application to be activated at the time of a document being detected has not been set, the processing proceeds to step S1109.

In step S1107, the CPU 211 asks the user whether to update the registered setting with the setting displayed in the operation unit 220. Specifically, the CPU 211 displays a notification screen 1000 on the screen of FIG. 8, as shown in FIG. 10.

In step S1108, the CPU 211 receives an operation of an operation key shown in the notification screen 1000 from the user, and determines whether the operation key pressed is the Yes button 1002. If the CPU 211 determines that the operation key pressed is the Yes button 1002, the processing proceeds to step S1109. If the CPU 211 determines that the operation key pressed is the No button 1001, the CPU 211 hides the notification screen 1000 and the processing proceeds to step S1102.

In step S1109, the CPU 211 links the operation setting with the user being logging in, and registers the operation setting to the setting table at the time of a document being detected. If the operation setting linked with the login user has already been registered in the setting table at the time of a document being detected, the operation setting is overwritten and updated.

In step S1110, the CPU 211 hides the notification screen 1000 and terminates this flowchart.

According to the flowchart in FIG. 11 described above, presenting a notification when the operation setting at the time of a document being detected that is associated with a user or a device have already been registered allows to set for a single user a single application to be activated at the time of a document being detected.

According to the MFP 101 of the present embodiment described above, presetting an application to be activated upon a document being detected and presetting an operation to be executed after the application is activated allow users to use the desired function when a document is just set. Therefore, an operation to select a function via an operation panel or an operation to instruct the execution of the function becomes unnecessary, which saves the user's time and trouble and improves usability. Moreover, since the operation at the time of a document being detected can be set for each device or each user, the function to be executed at the time of a document being detected can be changed as needed according to users or the operation of devices. In addition, since the operation panel of the MFP 101 is used by a number of users, there may be users who have a sense of hesitation to touching the operation panel. The present disclosure can provide a solution for such users in terms of usability.

Although the disclosure has been described together with the above embodiment, the above embodiment only shows an example of an embodiment for carrying out the present disclosure, and the technical scope of the present disclosure should not be limited by these descriptions of the above embodiment. That is, the present disclosure can be carried out in various forms without departing from its technical idea or the main features of the present disclosure.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to this disclosure, it becomes possible to provide an image processing apparatus in which the user can use the desired function without operating an operation panel.

While the present disclosure has been described with reference to the exemplary embodiment, it is to be understood that the present disclosure is not limited to the disclosed exemplary embodiment. The scope of the following claims is to be accorded with the broadest interpretation so as to encompass all such modifications and equivalent structures and functions.

This application claims the benefit of Japanese Patent Application No. 2022-020342, filed on Feb. 14, 2022, which is hereby incorporated by reference herein in its entirety.

What is claimed is:

1. An image processing apparatus comprising:
one or more memories; and
one or more processors in communication with the one or more memories, the one or more processors performing:
controlling executions of a plurality of functions; and
setting a setting content related to a predetermined function to be activated for each user if detecting that a document is set,
wherein the controlling includes:
activating the predetermined function by reflecting a first setting content set for a first user in a case where the image processing apparatus is being used by the first user and it is detected that a document has been set for an image reading unit of the image processing apparatus; and
activating the predetermined function by reflecting a second setting content set for a second user in a case where the image processing apparatus is being used by the second user and it is detected that a document has been set for an image reading unit of the image processing apparatus.

2. The image processing apparatus according to claim 1, wherein the controlling includes executing the predetermined function by reflecting the setting content set for a current user after activating the predetermined function.

3. The image processing apparatus according to claim 1, wherein the controlling includes displaying a screen for the predetermined function by reflecting the setting content set for a current user.

4. The image processing apparatus according to claim 1, wherein the controlling includes displaying a screen in a display unit after activating the predetermined function, the screen being used to allow to check a setting content set for a current user.

5. The image processing apparatus according to claim 1, wherein, in case of detecting a document being set for the image reading unit, the controlling includes:
activating the predetermined function if a screen displayed in a display unit is a predetermined screen, and
not activating the predetermined function if a screen displayed in a display unit is not the predetermined screen.

6. The image processing apparatus according to claim 1, wherein, in case of detecting the document being set, the setting includes setting whether a screen is displayed in a display unit or not, the screen being used to allow to check a setting value that is used when executing the predetermined application.

7. The image processing apparatus according to claim 1, wherein the setting includes setting one of the following functions as the predetermined function:
a function of printing image data generated by reading an image on a document at the image reading unit;
a function of transmitting the image data to an external device; and
a function of storing the image data in a storage device.

8. The image processing apparatus according to claim 1, wherein the image reading unit includes an automatic document feeder or a platen, and
wherein the controlling includes detecting that a document is set on the automatic document feeder or on the platen.

9. A method for controlling an image processing apparatus, the method comprising:
controlling executions of a plurality of functions; and
setting a setting content related to a predetermined function to be activated for each user if detecting that a document is set,
wherein the controlling includes:
activating the predetermined function by reflecting a first setting content set for a first user in a case where the image processing apparatus is being used by the first user and it is detected that a document has been set for an image reading unit of the image processing apparatus; and
activating the predetermined function by reflecting a second setting content set for a second user in a case where the image processing apparatus is being used by the second user and it is detected that a document has been set for an image reading unit of the image processing apparatus.

10. A non-transitory computer-readable storage medium storing a program for controlling an image processing apparatus, the program causing a computer to perform:
controlling executions of a plurality of functions; and
setting a setting content related to a predetermined function to be activated for each user if detecting that a document is set,
wherein the controlling includes:
activating the predetermined function by reflecting a first setting content set for a first user in a case where the image processing apparatus is being used by the first user and it is detected that a document has been set for an image reading unit of the image processing apparatus; and
activating the predetermined function by reflecting a second setting content set for a second user in a case where the image processing apparatus is being used by the second user and it is detected that a document has been set for an image reading unit of the image processing apparatus.

11. An image processing apparatus comprising:
one or more memories; and
one or more processors in communication with the one or more memories, the one or more processors performing:
controlling executions of a plurality of functions; and
setting a setting content related to a predetermined function to be activated for each user if detecting that a document is set,
wherein the controlling includes:
displaying a first screen for the predetermined function by reflecting a first setting content set for a first user in a case where the image processing apparatus is being used by the first user and it is detected that a document has been set for an image reading unit of the image processing apparatus; and
displaying a second screen for the predetermined function by reflecting a second setting content set for a second user in a case where the image processing apparatus is being used by the second user and it is detected that a document has been set for an image reading unit of the image processing apparatus.

12. The image processing apparatus according to claim 11, wherein the controlling includes executing the predetermined function by reflecting the setting content set for a current user after displaying a screen for the predetermined function.

13. The image processing apparatus according to claim 11 wherein the first screen is used to allow to check the first setting content, and the second screen is used to allow to check the second setting content.

14. The image processing apparatus according to claim 11, wherein, in case of detecting a document being set for the image reading unit, the controlling includes:

activating the predetermined function if a screen displayed in a display unit is a predetermined screen, and not activating the predetermined function if a screen displayed in a display unit is not the predetermined screen.

15. The image processing apparatus according to claim 11, wherein the setting includes setting one of the following functions as the predetermined function:

a function of printing image data generated by reading an image on a document at the image reading unit;

a function of transmitting the image data to an external device; and a function of storing the image data in a storage device.

16. The image processing apparatus according to claim 11, wherein the image reading unit includes an automatic document feeder or a platen, and wherein the controlling includes detecting that a document is set on the automatic document feeder or on the platen.

17. A method for controlling an image processing apparatus, the method comprising:

controlling executions of a plurality of functions; and setting a setting content related to a predetermined function to be activated for each user if detecting that a document is set, wherein the controlling includes:

displaying a first screen for the predetermined function by reflecting a first setting content set for a first user in a case where the image processing apparatus is being used by the first user and it is detected that a document has been set for an image reading unit of the image processing apparatus; and displaying a second screen for the predetermined function by reflecting a second setting content set for a second user in a case where the image processing apparatus is being used by the second user and it is detected that a document has been set for an image reading unit of the image processing apparatus.

18. A non-transitory computer-readable storage medium storing a program for controlling an image processing apparatus, the program causing a computer to perform:

controlling executions of a plurality of functions; and setting a setting content related to a predetermined function to be activated for each user if detecting that a document is set, wherein the controlling includes:

displaying a first screen for the predetermined function by reflecting a first setting content set for a first user in a case where the image processing apparatus is being used by the first user and it is detected that a document has been set for an image reading unit of the image processing apparatus; and displaying a second screen for the predetermined function by reflecting a second setting content set for a second user in a case where the image processing apparatus is being used by the second user and it is detected that a document has been set for an image reading unit of the image processing apparatus.

* * * * *